United States Patent
Evans

[15] 3,682,422
[45] Aug. 8, 1972

[54] TUBE CLAMPING MEMBER

[72] Inventor: Theodore D. Evans, 15134 29 Mile Road, Romeo, Mich. 48065

[22] Filed: Oct. 5, 1970

[21] Appl. No.: 77,874

[52] U.S. Cl. ........................... 248/68 CB, 24/125 R
[51] Int. Cl. ............................................. F16l 3/22
[58] Field of Search .248/68 CB, 67.5; 174/157, 156, 174/155; 24/125 R, 135 R

[56] References Cited

UNITED STATES PATENTS

| | | | |
|---|---|---|---|
| 3,397,431 | 8/1968 | Walker | 248/68 CB X |
| 3,128,331 | 4/1964 | Groom | 174/157 X |
| 3,464,661 | 9/1969 | Alesi | 248/68 CB |

FOREIGN PATENTS OR APPLICATIONS

| | | | |
|---|---|---|---|
| 954,405 | 4/1964 | Great Britain | 248/68 CB |

*Primary Examiner*—Chancellor E. Harris
*Attorney*—McGlynn, Reising & Elhengetor

[57] ABSTRACT

A tube clamping member for supporting hydraulic hoses, tubular conduits, and the like that comprises a plastic body having a base portion with a pair of side walls projecting from the side edges of the base portion and a pair of end walls projecting from the end edges of the base portion and extending between the ends of the side walls. A semi-circular recess for receiving tubes to be supported between two of the clamping members is formed in each of the side walls with the recesses in one side wall being in coaxial alignment with the recess in the other side wall. A pair of tubular guides for bolts or similar fasteners are enclosed by the side and end walls and project perpendicularly with respect to the base portion and are spaced from each other in the longitudinal direction of the base portion so that they are disposed one on each side of the recesses.

10 Claims, 5 Drawing Figures

PATENTED AUG 8 1972 3,682,422

INVENTOR
Theodore D. Evans
BY
Barnard, McGlynn & Reising
ATTORNEYS

TUBE CLAMPING MEMBER

This invention relates to devices for supporting one or more hydraulic hoses, tubular conduits or the like and is particularly concerned with the construction of a clamping member for use in such a support that can be secured in complementary relationship with another identical clamping member to form a support for one or more of such tubular conduits.

When large numbers of hydraulic hoses or other tubular conduits are present in factories, machine shops and the like, it is necessary to support the conduits in an organized fashion. Furthermore, it is desirable in many cases to provide a coupling supported at one location for a large number of hydraulic lines, or fluid conduits.

An object of this invention is to provide a tube supporting apparatus made up of molded plastic members of light-weight, inexpensive construction suitable for forming a support for one or a plurality of hydraulic lines or tubular conduits or connections.

In carrying out the foregoing, and other objects, a tube supporting assembly is made up of a pair of clamping members secured together in complementary relationship to support one, or a plurality of tubular members. Each clamping member includes a plastic body having a base portion with side walls projecting from the side edges of the base portion and end walls projecting from the end edges of the base portion and extending between the ends of the side walls. Semicircular recesses are formed in each side wall with the recess in one side wall being in coaxial alignment with the recess in the other side wall. Tubular fastener guides are molded integral with the base portion and project perpendicularly from the base portion and are enclosed by the end and side walls. The tubular fastener guides are spaced from each other along the longitudinal axis of the base portion so that one is located on each side of the recesses so that a tube received in the recesses lies between a pair of the fastener guides. To provide strength and rigidity to the clamping member, a longitudinal rib extends between each pair of the fastener guides and is formed with a recess similar to the recesses in the side walls and coaxial with the adjacent pair of recesses. Transverse ribs extend in opposite direction from each of the tubular guides to the adjacent side walls and transverse bracing ribs extend in opposite directions from the longitudinal rib to the adjacent side walls.

Two of the clamping members can be secured together by bolts or other fasteners extending through the tubular guide members. The semi-circular recesses on one of the clamping members cooperate with the recesses on the other clamping member to form circular openings for receiving the tubular members to be supported between the clamping members. The end and side walls enclose the members and prevent the entry of dirt and foreign matter. Additional sets of the clamping members can be secured to the assembly by aligning the guide members of one set or assembly with the guide members of another set so that bolts can extend through the several sets to secure them together.

Other objects, advantages and features of the invention will become apparent from the following description, taken in connection with the accompanying drawings in which.

Figure 1:
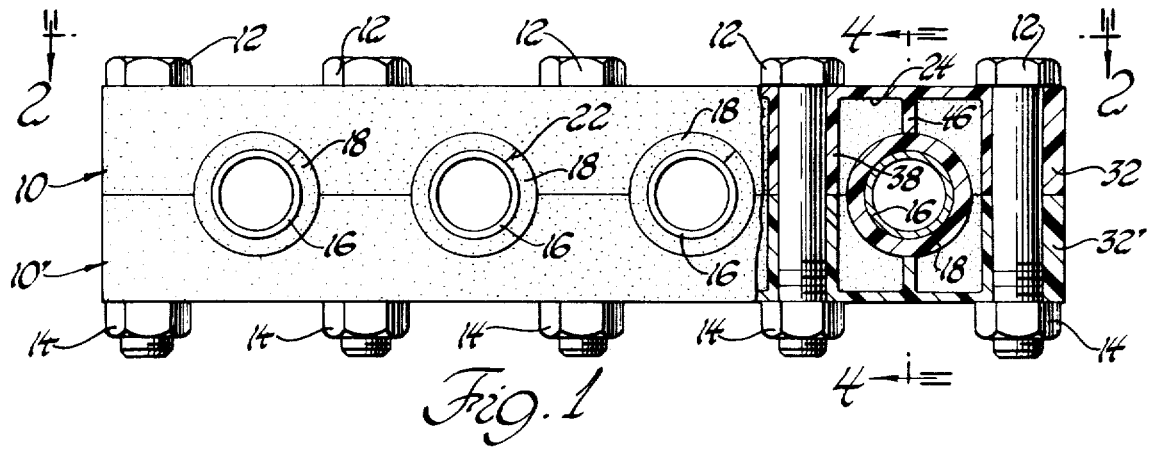
FIG. 1 is an elevational view of a tube supporting assembly according to the invention with a portion broken away to illustrate the interior of the assembly.
Figure 2:
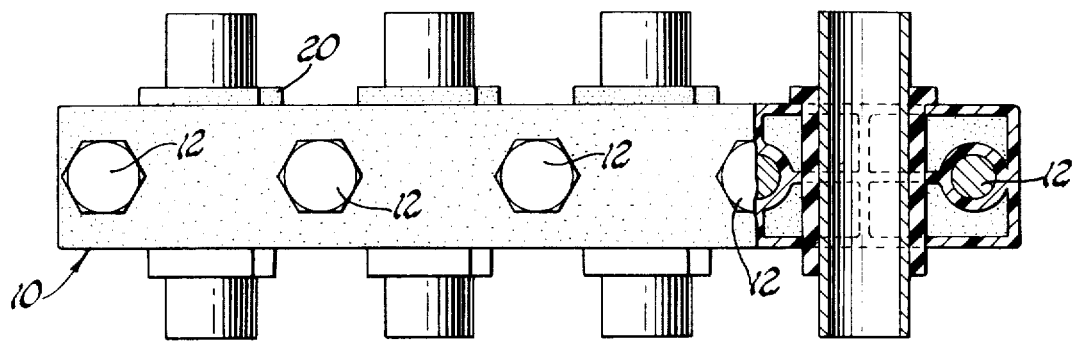
FIG. 2 is a plan view taken on lines 2—2 of FIG. 1 also having a portion broken away to illustrate interior details of the assembly.

FIGS. 1 and 2 illustrate a support assembly for tubular conduits or connectors 16. The support assembly is made up of clamping members 10 and 10' of identical construction which are secured together by bolts 12 and nuts 14. The tubular conduits 16 are mounted in sleeve members or grommets 18 of rubber, or other elastomeric material, the grommets each being formed with an end flange 20. The end flanges 20 assist in locating the sleeves properly with respect to the clamping members during installation. The rubber grommets 18 are split as indicated at 22 to permit the tubes 16 to be mounted therein by resiliently forcing the grommets onto the tubes.

Figure 3:
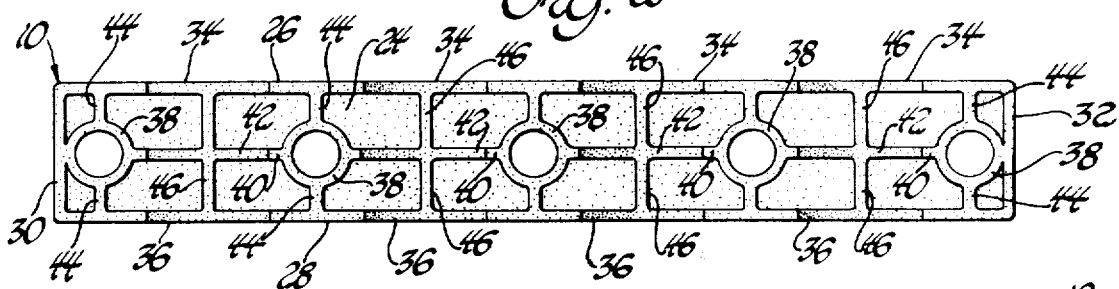
FIG. 3 is a plan view of one of the clamping members used in the assembly of FIGS. 1 and 2.
Figure 4:
FIG. 4 is a sectional view taken on lines 4—4 of FIG. 1.
Figure 5:
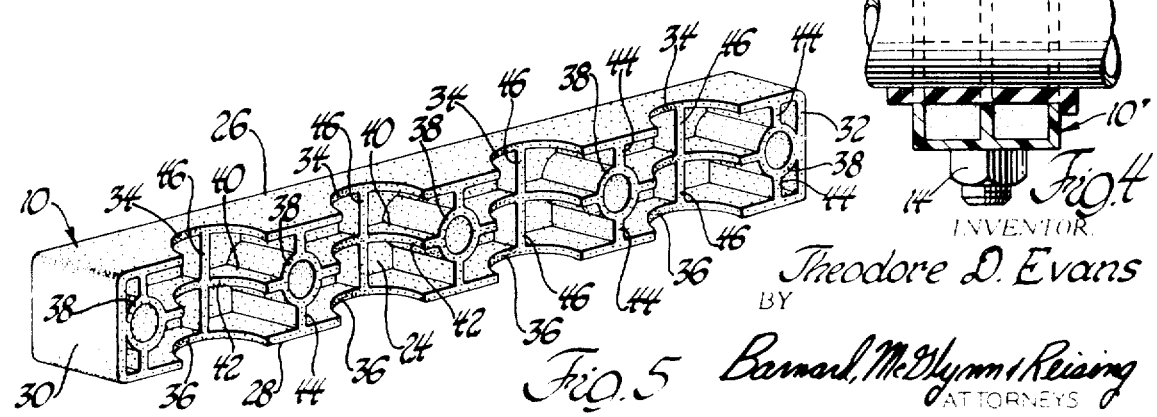
FIG. 5 is a perspective view of the clamping member shown in FIG. 3.

The construction of the clamping member 10 is illustrated in detail in FIGS. 3 and 5. Since the clamping members 10 and 10' are of identical construction, the clamping member 10 only will be described.

With reference to FIGS. 3 and 5, the clamping member 10 comprises a molded plastic body having a base portion 24 and a pair of side walls 26 and 28 projecting from the side edges of the base portion 24. A pair of end walls 30 and 32 project from the end edges of the base portion 24 and extend between the ends of the side walls 26 and 28.

The side wall 26 is formed with a plurality of semi-circular recesses 34 extending from the outer free edge of the side wall toward the base portion 24. Similarly, the side wall 28 is formed with a plurality of semi-circular recesses 36 extending from the outer free edge of the side wall toward the base portion 24. Each recess 34 in side wall 26 is in coaxial alignment with a recess 36 in the other side wall 28.

Tubular fastener guides 38 project from the inner surface of the base portion 24 and are spaced along the longitudinal axis of the base portion so that a tubular guide 38 is disposed on each side of an axially aligned pair of semi-circular recesses 34 and 36. A longitudinal rib 40 projects from the inner surface of the base portion between each adjacent pair of the tubular guides 38 with its ends joined to the respective guides. Formed in each of the longitudinal ribs 40 is a semi-circular recess 42 in coaxial alignment with the adjacent pair of recesses 34 and 36.

Transverse guide ribs 44 project from the inner surface of the base portion 24 and extend between the guides 38 and the side walls 26 and 28 in opposite directions. Transverse bracing ribs 46 extend in opposite directions from the longitudinal ribs 42 to the side walls 26 and 28. The bracing ribs 46 extend along the axis of the recesses 34, 36, and 42 transversely with respect to the longitudinal ribs 42.

The tubular fastener guides 38 are thus enclosed by the side walls 26, 28 and the end walls 30, 32. The tubular guides 38 adjacent the end walls 30 and 32 are joined integrally to the end walls.

As shown in FIG. 1, two of the clamping members are placed in complementary relationship with the free ends of the side walls and longitudinal ribs in opposed relationship. The recesses 34, 36 and 42 of the two clamping members cooperate to form circular openings for receiving the grommets 18 and tubes 16. Fasteners 12 have their shanks extending through the aligned guides 38 to clamp the tube 16 in position in the support assembly. The side and end walls of the clamping members 10 and 10' prevent the entry of dirt and foreign matter into the interior of the support assembly.

The clamping members 10 can be molded in one piece in any desired length, that is, to serve as a support for a single tube 16 or a plurality. Furthermore, while the assembly of FIG. 1 comprises one set or pair of members 10, 10', it is apparent that additional sets of clamping members can be secured to the assembly of FIG. 1 by aligning the fastener guides of one set with the fastener guides of the other set or sets. Bolts 12 of sufficient length to extend through two or more pairs of members 10, 10' as necessary can secure the multiple sets together.

While a specific embodiment of the invention has been illustrated and described in the foregoing specification and accompanying drawing, it should be understood that the invention is not limited to the exact construction shown but that various alternatives in the construction and arrangement of parts, all falling within the scope of the invention, will be apparent to those skilled in the art.

What is claimed is:

1. A tube clamping member comprising: a plastic body having a base portion; a pair of side walls projecting from the side edges of said base portion; a pair of end walls projecting from the end edges of said base portion and extending between the ends of said side walls; a tube receiving recess formed in each side wall and extending from the outer free edge of the respective side wall toward said base portion, the recess in one side wall being in coaxial alignment with the recess in the other side wall; and a pair of tubular fastener guides enclosed by said side and end walls and projecting perpendicularly with respect to said base portion, said guides being spaced from each other in the longitudinal direction of said base portion and disposed one on each side of said coaxially aligned recesses.

2. A tube clamping member as claimed in claim 1 further including a longitudinal rib projecting from the inner surface of said base portion with its ends joined to said tubular guides.

3. A tube clamping member as claimed in claim 2 wherein said longitudinal rib is formed with a tube receiving recess in coaxial alignment with the recesses in said side walls.

4. A tube clamping member as claimed in claim 1 further including at least one transverse guide rib extending between each of said guides and one of said side walls and projecting from said base portion.

5. A tube clamping member as claimed in claim 3 further including at least one transverse guide rib extending between each of said guides and one of said side walls and projecting from said base portion.

6. A tube clamping member as claimed in claim 2 including a pair of transverse bracing ribs projecting from said base portion and extending in opposite directions from said longitudinal rib to an adjacent side wall between said guides.

7. A tube clamping member as claimed in claim 5 including a pair of transverse bracing ribs projecting from said base portion and extending in opposite directions from said longitudinal rib between said guide to an adjacent side wall and each having an outer free end terminating at the periphery of said recesses.

8. A tube clamping member comprising: an integral plastic body having a base portion; a pair of side walls projecting from the side edges of said base portion; a pair of end walls projecting from the end edges of said base member and extending between said side walls; a plurality of semi-circular tube receiving recesses formed in each of said side walls extending from the outer free edge of the respective side wall toward the respective base portion, each recess in one side wall being in coaxial alignment with a recess in the other side wall; a plurality of tubular fastener guides projecting perpendicularly from the inner surface of said base portion and enclosed by said side and end walls, said guides being spaced from each other along the longitudinal axis of said base portion and disposed one on each side of each of the aligned pairs of tube receiving recesses, the outer pair of guides being joined to the respective end walls; a longitudinal rib projecting from the base portion and extending between each pair of guides with its ends joined to said guides; a semi-circular tube receiving groove formed in each of said longitudinal ribs in coaxial alignment with the adjacent recesses in said side walls; a pair of transverse guide ribs extending in opposite directions from each guide to the adjacent side wall; and a pair of transverse bracing ribs extending in opposite directions from said longitudinal ribs to the opposite side walls along the axis of each set of aligned tube receiving recesses.

9. A support assembly for tubular members comprising: a pair of complementary one piece, plastic bodies each having a base portion with a pair of side walls projecting from the side edges of said base portion, a pair of end walls projecting from the end edges of said base portion and extending between said side walls, at least one tube receiving recess formed in each side wall extending toward the respective base portion from the outer free edge of the respective side wall, each recess in one wall being in coaxial alignment with a recess in the opposite wall, and at least one pair of tubular fastener receiving guides enclosed by the side and end walls and projecting from the base portion, said guides being spaced from each other in the longitudinal direction of said base portion and disposed one on each side of a coaxially aligned pair of recesses; the outer free ends of the side and end walls of said pair of bodies being engaged with each other such that the guides of one body are in alignment with the guides of the other body and the recesses of one body cooperate with the recesses of the other body to define openings for receiving a tubular member; and fasteners extending through the aligned guides to secure said bodies together.

10. A support assembly as defined in claim 9 further including elastomeric sleeve members received in the openings defined by said recesses, and a tubular member mounted in each of said sleeve members.

* * * * *